(12) United States Patent
Jang et al.

(10) Patent No.: US 12,503,250 B2
(45) Date of Patent: Dec. 23, 2025

(54) SYSTEMS AND METHOD TO DETERMINE CONNECTION OF A BOOM WITH A RECEIVER AIRCRAFT

(71) Applicant: The Boeing Company, Arlington, VA (US)

(72) Inventors: Jung Soon Jang, Bellevue, WA (US); Justin Cleve Hatcher, Sumner, WA (US)

(73) Assignee: THE BOEING COMPANY, Arlington, VA (US)

( * ) Notice: Subject to any disclaimer, the term of this patent is extended or adjusted under 35 U.S.C. 154(b) by 382 days.

(21) Appl. No.: 18/162,222

(22) Filed: Jan. 31, 2023

(65) Prior Publication Data

US 2024/0253814 A1    Aug. 1, 2024

(51) Int. Cl.
*B64D 45/00* (2006.01)
*B64D 39/00* (2006.01)

(52) U.S. Cl.
CPC .......... *B64D 45/0005* (2013.01); *B64D 39/00* (2013.01)

(58) Field of Classification Search
CPC ............................ B64D 45/0005; B64D 39/00
USPC ...................................................... 701/29.1
See application file for complete search history.

(56) References Cited

U.S. PATENT DOCUMENTS

| | | | |
|---|---|---|---|
| 4,158,885 A * | 6/1979 | Neuberger | G01S 17/88 356/28 |
| 4,586,683 A * | 5/1986 | Kerker | B64D 39/00 244/135 A |
| 7,980,512 B1 * | 7/2011 | Speer | C07D 271/113 244/135 A |
| 10,124,904 B2 | 11/2018 | Hinson et al. | |
| 10,279,923 B2 * | 5/2019 | Marcos Montes | B64D 39/04 |
| 10,343,788 B2 | 7/2019 | Jacobus et al. | |
| 10,436,583 B1 | 10/2019 | Golob et al. | |
| 10,699,125 B2 | 6/2020 | Mosher et al. | |
| 11,047,742 B2 | 6/2021 | Chrien | |
| 11,113,905 B2 | 9/2021 | Korchev et al. | |
| 11,427,345 B2 | 8/2022 | Hinson et al. | |
| 2003/0136874 A1 * | 7/2003 | Gjerdrum | B64D 39/00 244/10 |
| 2007/0023574 A1 * | 2/2007 | von Thal | B64D 39/00 244/135 A |
| 2007/0023575 A1 * | 2/2007 | von Thal | B64D 39/00 244/135 A |
| 2007/0040065 A1 * | 2/2007 | Von Thal | B64D 39/04 244/135 A |
| 2007/0215753 A1 * | 9/2007 | Schuster | B64D 39/00 244/135 A |
| 2009/0127394 A1 * | 5/2009 | Adarve Lozano | B64D 39/00 244/135 A |
| 2009/0248225 A1 * | 10/2009 | Stecko | B64D 39/00 244/135 A |
| 2010/0108816 A1 * | 5/2010 | Lozano | B64D 39/00 244/135 A |

(Continued)

*Primary Examiner* — Luis A Martinez Borrero
(74) *Attorney, Agent, or Firm* — COATS & BENNETT, PLLC

(57) ABSTRACT

Methods and systems for determining the connection status of a boom of a tanker aircraft with a receiver aircraft. The detection utilizes sensors mounted on the boom. Signals from the sensors are converted from a time domain to a frequency domain. Modes within the frequency domain are identified and analyzed to determine the connection status of the boom with the receiver aircraft.

20 Claims, 8 Drawing Sheets

(56) References Cited

U.S. PATENT DOCUMENTS

| | | | |
|---|---|---|---|
| 2010/0243812 A1* | 9/2010 | Gasco Nunez | B64D 39/04 244/135 A |
| 2010/0327116 A1* | 12/2010 | De Miguel | B64D 39/00 244/135 A |
| 2012/0104171 A1* | 5/2012 | Martinez | B64D 39/04 244/135 A |
| 2014/0021300 A1* | 1/2014 | Hatcher | B64D 39/06 244/135 A |
| 2014/0042274 A1* | 2/2014 | Hatcher | B64D 39/00 244/135 A |
| 2014/0203147 A1* | 7/2014 | Barsheshet | B64D 39/04 244/135 A |
| 2015/0284106 A1* | 10/2015 | Reinholdt | B64D 39/04 244/135 A |
| 2016/0258750 A1* | 9/2016 | Golob | B64D 39/00 |
| 2016/0311554 A1* | 10/2016 | Marcos Montes | B64D 39/06 |
| 2017/0008637 A1* | 1/2017 | Hinson | B64D 39/00 |
| 2018/0088000 A1* | 3/2018 | Asensio Nieto | G01M 5/0016 |
| 2018/0178924 A1* | 6/2018 | Zomeño Rodríguez | B64D 39/04 |
| 2022/0258875 A1* | 8/2022 | Kyono | G06V 20/56 |
| 2022/0276652 A1* | 9/2022 | Kyono | G05D 1/0094 |
| 2022/0297849 A1* | 9/2022 | Rodriguez Robles | G01M 5/0041 |
| 2022/0306311 A1* | 9/2022 | Kyono | G06T 7/11 |
| 2023/0026394 A1* | 1/2023 | Rock | G06T 7/11 |

\* cited by examiner

SYSTEMS AND METHOD TO DETERMINE CONNECTION OF A BOOM WITH A RECEIVER AIRCRAFT

TECHNOLOGICAL FIELD

The present disclosure relates generally to the field of aircraft and, more specifically, to determining the connection status of a refueling boom of a tanker aircraft with a receiver aircraft.

BACKGROUND

Aerial refueling transfers fuel during flight from a tanker aircraft to a receiver aircraft. A refueling boom (boom) is attached to the tanker aircraft and is movable between a stowed position when not in use and a deployed position when in use to refuel the receiver aircraft. In the deployed position, a nozzle on the boom connects to the receiver aircraft at a receptacle. Once connected, fuel is transferred from the tanker aircraft, through the boom, and into the receiver aircraft. After the fueling, the nozzle is disconnected from the receiver aircraft, and the boom is moved away from the receiver aircraft.

The transfer of fuel from the tanker aircraft occurs after there is a determination that the nozzle is connected to the receiver aircraft. Existing systems use various manners of determining that the nozzle is connected. One system uses a passive sensor that senses that physical contact has been made between the nozzle and the receptacle. The system includes signal coils on the nozzle and on the receptacle. An issue with this system is it relies on the physical contact between the two signal coils. This contact is susceptible to nozzle misalignment or binding resulting in incorrect indication of the condition (i.e., false positives and false negatives).

Another system relies on situational awareness of the aerial refueling operator. The operator determines when the nozzle is connected prior to starting the refueling. An issue with this system is the determination of the operator is subjective and can vary between operators. This system can also require highly-trained and/or experienced operators to accurately make this determination. Further, this can add more workload to already high gain/stress tasks which can potentially result in mistakes.

SUMMARY

One aspect is directed to a method of determining a connection status of a boom that extends from a tanker aircraft with a receiver aircraft. The method comprises: receiving signals from one or more sensors that sense a structural property of the boom: generating a signal output of the structural property in a time domain: converting the signal output from the time domain to a frequency domain: isolating modes within the frequency domain: monitoring the modes in the frequency domain; and determining the connection status of the boom based the modes.

In another aspect, the method further comprises determining when the boom connects to the receiver aircraft based on a change in the modes above a predetermined threshold.

In another aspect, the method further comprises measuring the dynamic motion of the boom based on signals from three inertial measurement units that are positioned on the boom.

In another aspect, monitoring the modes in the frequency domain comprises monitoring the modes in real time.

In another aspect, the structural property comprises one or more of stiffness and mass of the boom.

In another aspect, receiving the signals from the one or more sensors that sense the structural property of the boom comprises receiving the signals of an axial load on the boom.

In another aspect, receiving the signals from the one or more sensors that sense the structural property of the boom comprises receiving the signals of a vertical/lateral load exerted on the boom.

In another aspect, the method further comprises determining the connection status of the boom without receiving a connection signal from a contact sensor on the boom.

In another aspect, the method further comprises applying a Fourier transform to the signal output and generating the signal output in the frequency domain.

One aspect is directed to a computing device configured to determine a connection status of a boom that extends from a tanker aircraft with a receiver aircraft. The computing device comprises memory circuitry configured to store programming instructions and processing circuitry. The processing circuitry is configured to: receive signals indicating a dynamic motion of the boom: generate the dynamic motion of the boom in a frequency domain: monitor modes of the dynamic motion within the frequency domain: determine that the boom is in a free flight condition based on the modes; and determine that the boom is in a contact flight condition when the boom connects to the receiver aircraft based on the modes.

In another aspect, the processing circuitry is further configured to determine a change in the modes within the frequency domain and determine that the boom has moved from the free flight condition to the contact flight condition.

In another aspect, the processing circuitry is further configured to receive input signals from an input device that adjusts a position of the boom relative to the receiver aircraft.

In another aspect, the processing circuitry is further configured to isolate the modes within the frequency domain prior to monitoring the modes of the dynamic motion.

In another aspect, the processing circuitry is configured to determine a change in mass of the boom.

In another aspect, the processing circuitry is configured to determine a change in stiffness of the boom.

In another aspect, one or more inertial measurement units are configured to be mounted on the boom to detect the dynamic motion of the boom.

In another aspect, the computing device is positioned on the tanker aircraft.

In another aspect, the computing device is ground-based and remote from both the tanker aircraft and the receiver aircraft.

One aspect is directed to a computer program product comprising program code to be executed by a computing device to determine a connection status of a boom on a tanker aircraft with a receiver aircraft whereby execution of the program code causes the computing device: receive signals indicating a dynamic motion of the boom: generate the dynamic motion of the boom in a frequency domain; monitor modes of the dynamic motion within the frequency domain: isolate modes within the frequency domain; monitor the modes in the frequency domain; and determine that the boom has connected to the receiver aircraft based on a change in the modes.

In another aspect, the program code causes the computing device to monitor the modes in the frequency domain in real time.

The features, functions and advantages that have been discussed can be achieved independently in various aspects or may be combined in yet other aspects, further details of which can be seen with reference to the following description and the drawings.

BRIEF DESCRIPTION OF THE DRAWINGS

FIG. 3A is a schematic diagram of a boom that includes a pair of sensors that are spaced apart along the length of the boom.

DETAILED DESCRIPTION

The present application is directed to methods and systems for determining the connection status of a boom with a receiver aircraft. The detection utilizes sensors mounted on the boom. The signals are converted from a time domain to a frequency domain. Modes within the frequency domain are identified and analyzed to determine the connection status.

Figure 1:
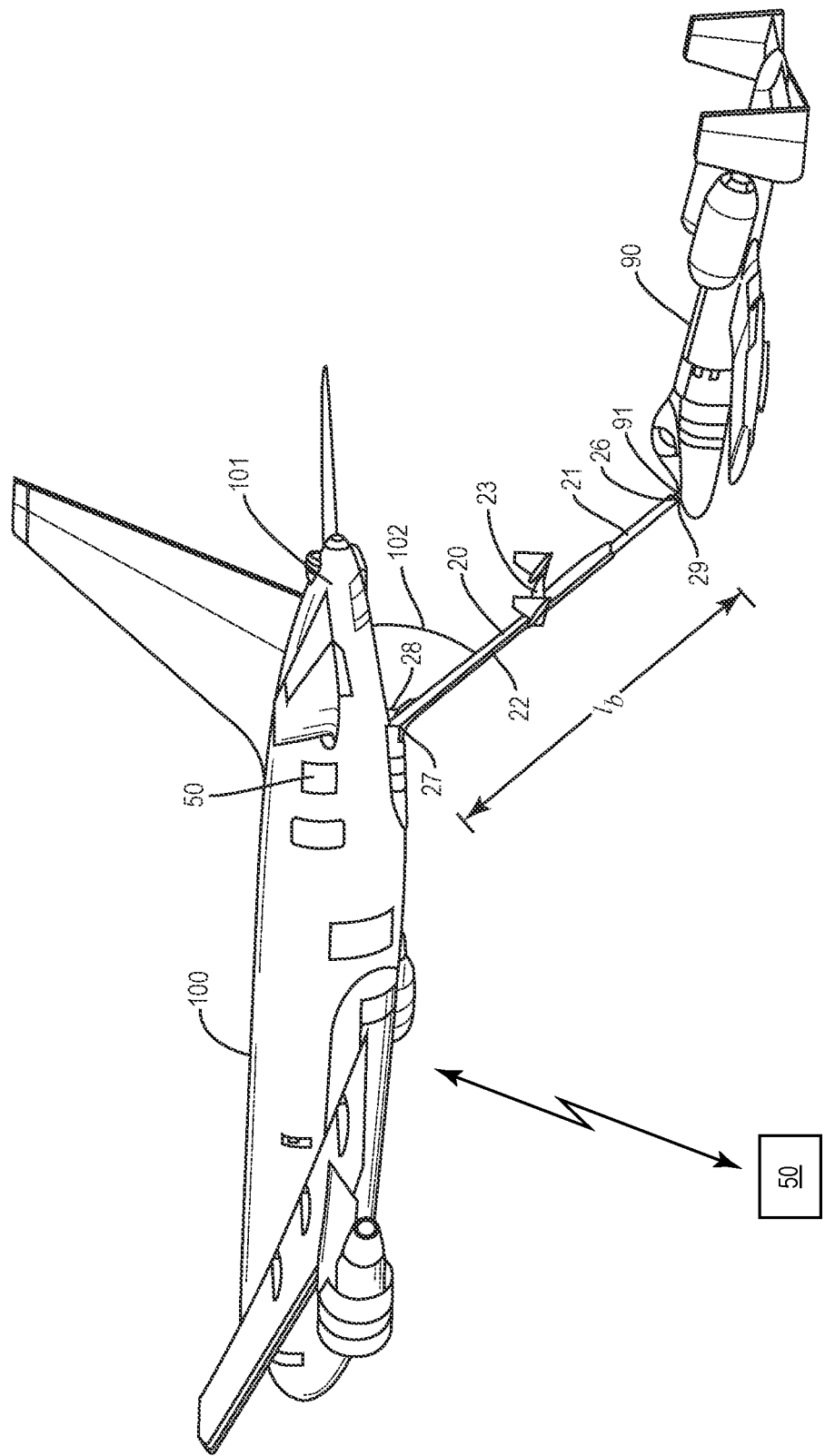
FIG. 1 is a perspective view of a boom that extends from a tanker aircraft for refueling of a receiver aircraft.

FIG. 1 illustrates a boom 20 for transferring fuel from a tanker aircraft 100 to a receiver aircraft 90. The boom 20 includes a telescoping tube 21 that is mechanically supported within a fixed tube 22. The boom 20 has a length $l_b$ measured between a proximal end 28 at the connection with the tanker aircraft 100 and a distal end 29 at a nozzle 26. The boom 20 includes one or more control surfaces 23 such as rudders and an elevator to control a roll and pitch. The fixed tube 22 is connected at a hinge 27 to a rear fuselage 101 of the tanker aircraft 100. A hoist cable 102 extends between the fuselage 101 and the boom 20 to assist the control surfaces 23 to position the boom 20. The hoist cable 102 is also configured to stow the fixed tube 22 at the rear fuselage 101.

The boom 20 is configured for the telescoping tube 21 to extend and/or retract from the fixed tube 22. The telescoping tube 21 includes the nozzle 26 at a distal end. Extension of the telescoping tube 21 from the fixed tube 22 provides for the nozzle 26 to connect with a receptacle 91 of the receiver aircraft 90. Once the nozzle 26 is engaged in the receptacle 91, fuel is transferred through the boom 20 from the tanker aircraft 100 to the receiver aircraft 90. After the fuel has been dispensed, the nozzle 26 is disengaged from the receptacle 91. The telescoping tube 21 is retracted into the fixed tube 22 and the boom 20 is pulled back towards the fuselage 101.

Figure 2:
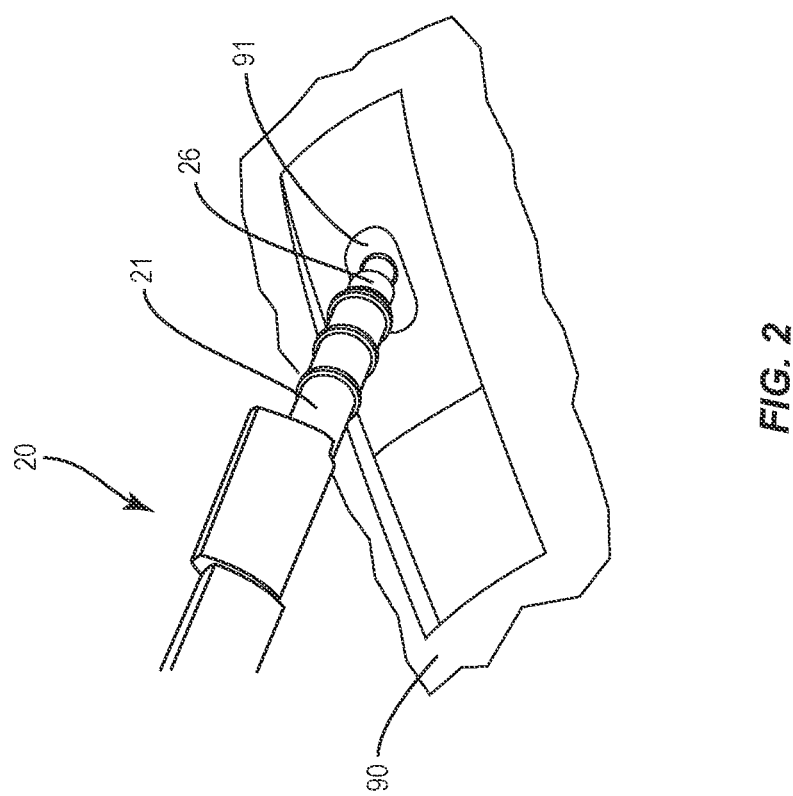
FIG. 2 is a perspective view of a nozzle of a boom engaged with a receptacle of a receiver aircraft.

FIG. 2 illustrates the nozzle 26 engaged in the receptacle 91. During engagement, the boom 20 is angularly positioned relative to the receiver aircraft 90 and the telescoping tube 21 is extended to position the tip of the nozzle 26 into the receptacle 91. Once connected, fuel is transferred through the boom 20 from the tanker aircraft 100 to the receiver aircraft 90.

During flight, forces acting on the boom 20 result in dynamic motion of the boom 20. One or more sensors 30 are mounted on the boom 20 to measure the dynamic motion of the boom 20 relative to one or more properties (e.g., mass, stiffness, boundary condition) of the boom 20. The sensors 30 measure a wide spectrum of frequencies that include rigid and structural modes of the boom. Various types of sensors 30 are used to measure the boom 20. In one example, a sensor 30 is an assembly of one or more accelerometers and gyroscopes. In another example, the sensor 30 is a load sensor assembly configured to detect tension and compression forces that are exerted on the boom 20. The sensors 30 can be positioned at different points along the length $l_b$ of the boom 20.

Figure 3:
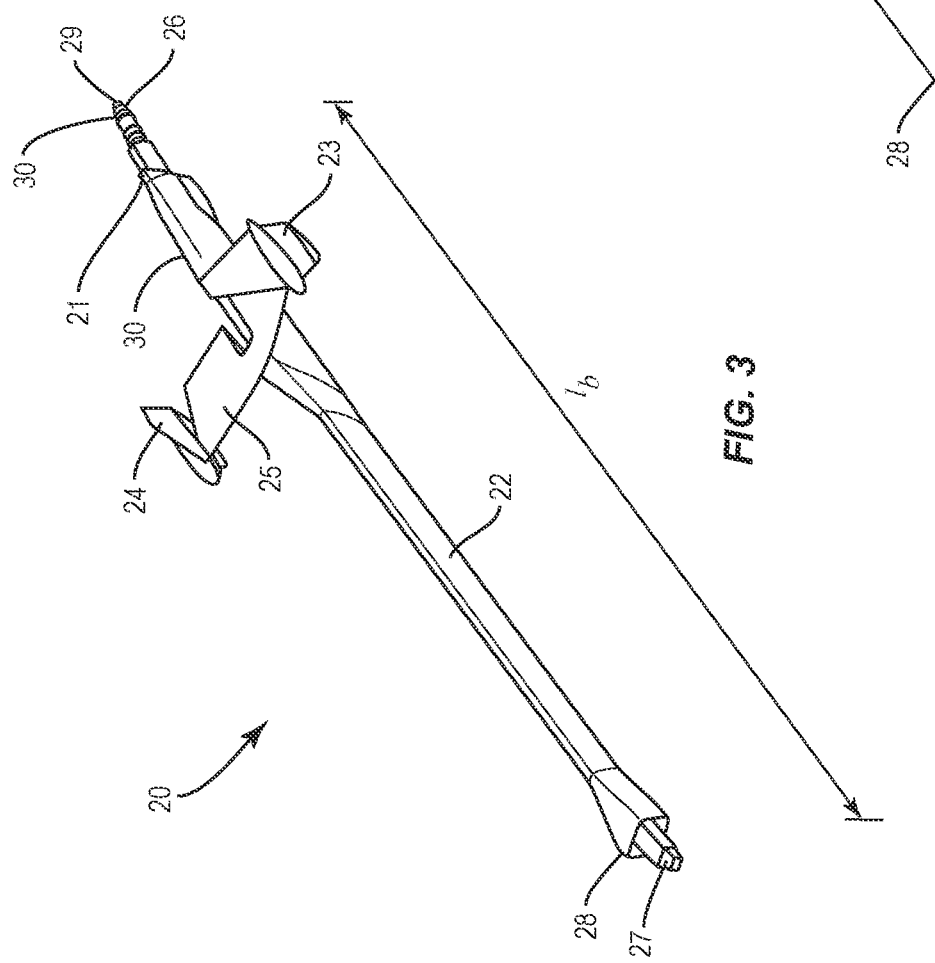
FIG. 3 is a perspective view of a boom that includes sensors positioned along the length to measure one or more aspects of the boom.

FIG. 3A schematically illustrates an example of a pair of sensors 30a, 30b mounted on the boom 20. The sensors 30a, 30b are spaced apart along the boom 20. Sensor 30a is a load sensor that is positioned towards the distal end 29 of the boom 20. The sensor 30a measures radial forces in different planes (Fy, Fz) and an axial force (Fx) applied along the length of the boom 20. Sensor 30b is positioned upward from the sensor 30a (i.e., towards the proximal end 28). Sensor 30b is an inertial measurement unit (IMU) that detects an angular rate and linear acceleration in different planes (e.g., x, y, and z planes).

Signals from the sensors 30 are sent to a computing device 50. The computing device 50 processes the signals and determines the connection status of the boom 20. The connection status is determined based on readings from one or more of the sensors 30 that indicate one or more aspects of the boom 20. The connection status can be determined based on one or more of a detected aspect relative to a threshold and a change in the boom 20.

Figure 4:
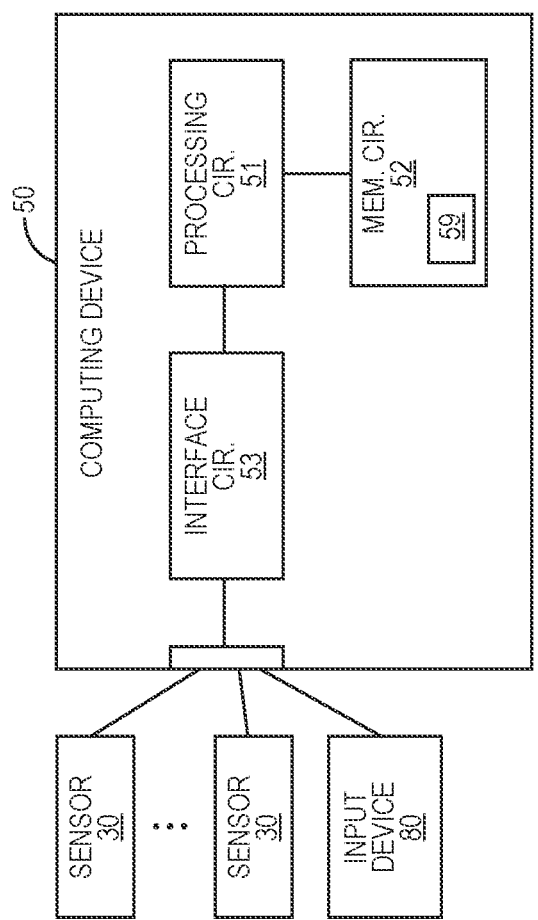
FIG. 4 is a schematic diagram of a computing device that receives input from sensors and an input device.

As illustrated in FIG. 4, the computing device 50 includes processing circuitry 51, memory circuitry 52, and interface circuitry 53. The processing circuitry 51 controls overall operation according to program code 59 stored in the memory circuitry 52. The processing circuitry 51 can include one or more circuits, microcontrollers, microprocessors, hardware, or a combination thereof. The processing circuitry 51 can include various amounts of computing power to provide for the needed functionality.

Memory circuitry 52 includes a non-transitory computer readable storage medium storing program instructions, such as a computer program product, that configures the processing circuitry 51 to implement one or more of the techniques discussed herein. Memory circuitry 52 can include various memory devices such as, for example, read-only memory, and flash memory. Memory circuitry 52 can be a separate component as illustrated in FIG. 4 or can be incorporated with the processing circuitry 51. Alternatively, the processing circuitry 51 can omit the memory circuitry 52, e.g., according to at least some embodiments in which the processing circuitry 51 is dedicated and non-programmable. In one example, the memory circuitry 52 includes a solid state device (SSD).

The interface circuitry 53 provides for receiving signals from the one or more sensors 30. The interface circuitry 53 is further configured to receive signals from an input device 80 that is used by an operator to control the boom 20. In one example, the input device 80 is a joystick used to control the angular position of the boom 20 and the position of the telescoping tube 21 relative to the fixed tube 22.

The computing device 50 is configured to determine the connection status of the boom 20 with the receiver aircraft 90. The determination is based on the dynamic motion of the boom 20 determined from readings from the one or more sensors 30. Prior to connection, the rigid body natural frequency $w_n^f$ of the boom 20 exhibits characteristics of a cantilevered beam having a mass of the boom 20:

$$\omega_n^f = \sqrt{\frac{3EI}{m_b l_b^3}} \qquad \text{Eq 1}$$

with: E—Young's modulus of the boom
I—moment of inertia of the boom
$m_b$—mass of the boom
$l_b$—length of the boom When the boom 20 is attached to the receiver aircraft 90, the natural frequency $w_n^c$ of the boom 20 exhibits characteristics of a cantilevered beam having a mass of the boom 20 with a lumped mass of the receiver aircraft 90:

$$\omega_n^c = \sqrt{\frac{3E'I'}{(m_b + m_r)l_b^3}} \qquad \text{Eq 2}$$

with: E'—Young's modulus of both the boom and the receiver
I'—moment of inertia of both the boom and the receiver
$m_r$—mass of the receiver aircraft Upon receiving the signals from the one or more sensors 30, the computing device 50 converts the signals from a time domain to a frequency domain. The computing device 50 isolates the frequency modes and monitors the status. Changes in the connection status of the boom 20 are determined based on changes in the modes of the frequency domain. An advantage of this detection is the connection status is determined without relying on signal amplifiers from connection coils that are mounted in the boom 20 and the receptacle 91.

Figure 5:
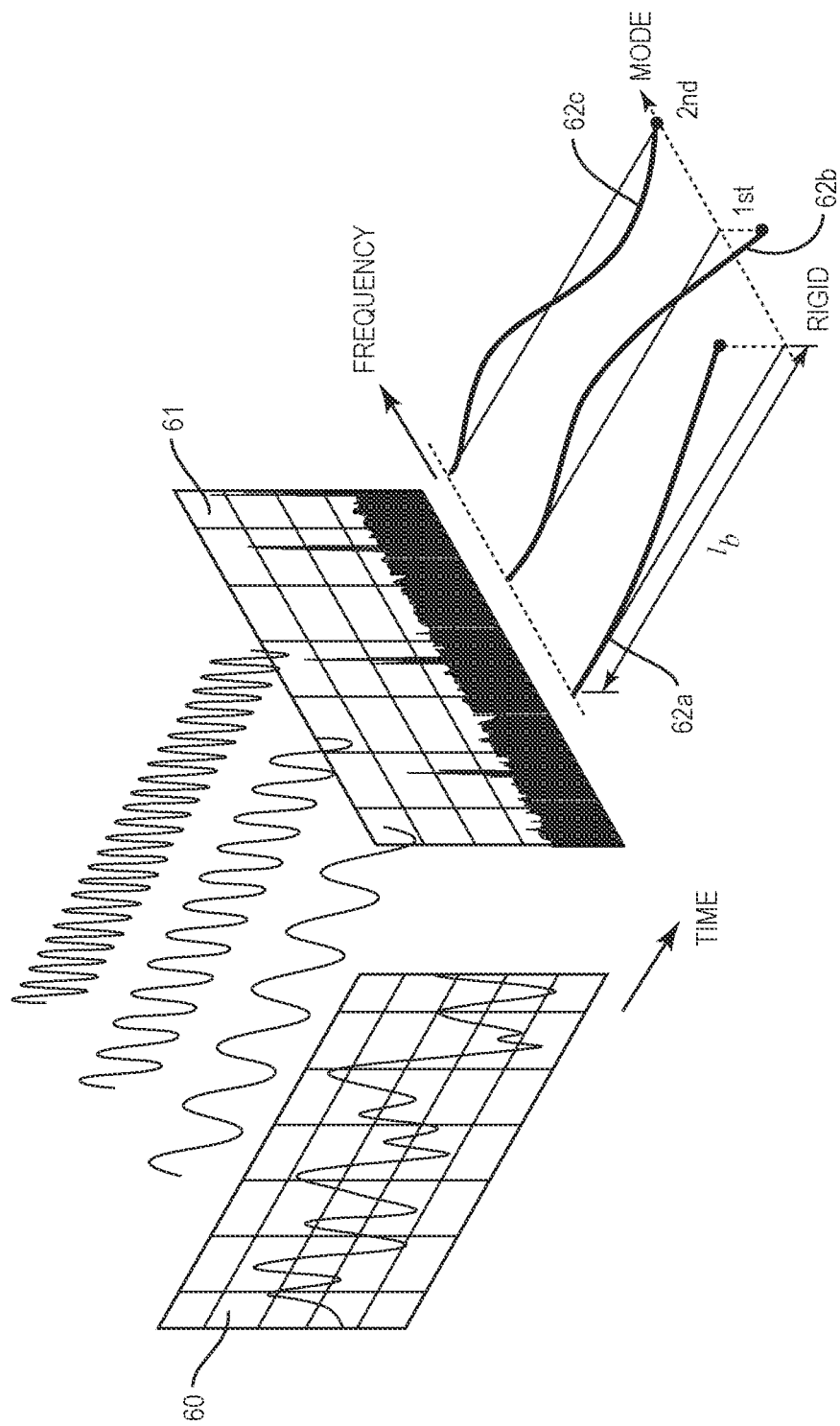
FIG. 5 is a schematic diagram of detected data in a time domain that is then converted to a frequency domain with different modes isolated in the frequency domain.

FIG. 5 schematically illustrates processing of the sensor data performed by the computing device 50. The signals received from the sensors 30 are initially generated in a time domain 60. However, monitoring the time domain for changes in the connection status is problematic as the changes in the connection status are difficult to ascertain.

To address this issue, the computing device 50 converts the signals from the time domain 60 to the frequency domain 61. FIG. 5 includes the data in a representation in the frequency domain 61. The computing device 50 applies a Fast Fourier Transform (FFT) to time domain values. The transform outputs the dynamic motion data in a frequency domain 61.

The computing device 50 further decomposes the frequency domain data into modal frequencies 62a, 62b, 62c. The computing device 50 monitors the isolated modes to determine the connection status of the boom 20. In one example, the computing device 50 monitors the modes in real-time to maintain the status of the boom 20.

Figure 6A:
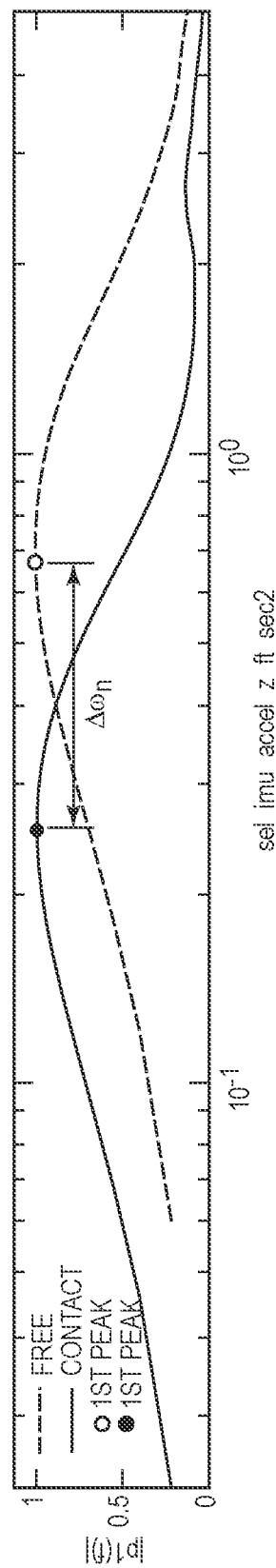
FIG. 6A is a chart illustrating detected acceleration in both a free flight condition and a connected flight condition.

FIG. 6A illustrates an example of sensed data in a frequency domain. Specifically, this data illustrates the detected linear acceleration in the z axis. The natural frequency of the boom 20 exhibits different characteristics based on the connection status. The data indicates a shift in a first modal peak between when the boom 20 is connected to the receiver aircraft 90 and when the boom 20 is free (i.e., not connected).

Figure 6B:
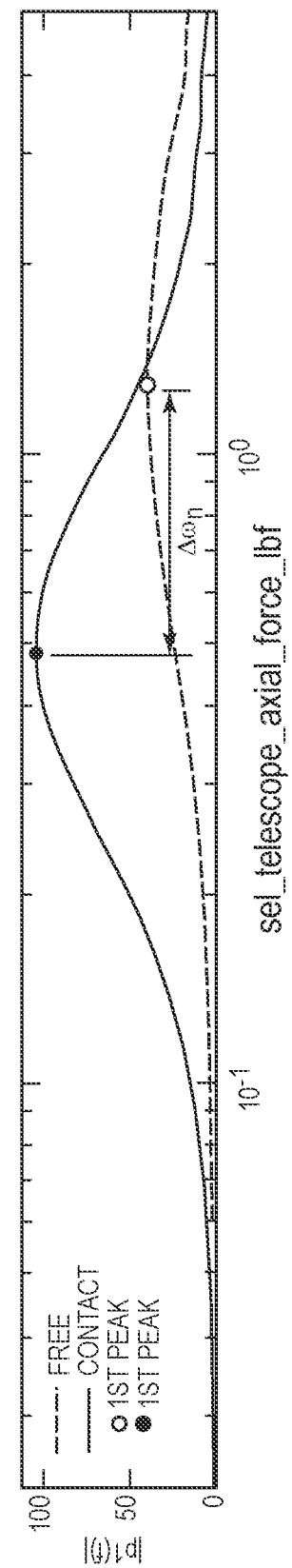
FIG. 6B is a chart illustrating detected axial force in both a free flight condition and a connected flight condition.

FIG. 6B illustrates the sensed data for the axial force along the boom 20. The data indicates the differences in the axial forces in the first mode between a connected status and a free status. Again, peaks shift between the two different connection configurations.

The computing device 50 is configured to determine the status based on the data in the frequency domain. In one example, the computing device 50 monitors shift in the data that is experienced upon a change in the connection status. In another example, the computing device 50 determines the connection status based on the relative values in the frequency domain.

In one example, predetermined threshold data is maintained that is indicative of a particular connection status. In one example, the threshold data is based on prior testing. The computing device 50 determines the status based on the sensed data and the predetermined threshold. In another example, the computing device 50 monitors the detected values from the sensors 30. The computing device 50 detects a change in the values above a predetermined amount, such as the change indicated in the examples of FIGS. 6A and 6B.

Figure 7:
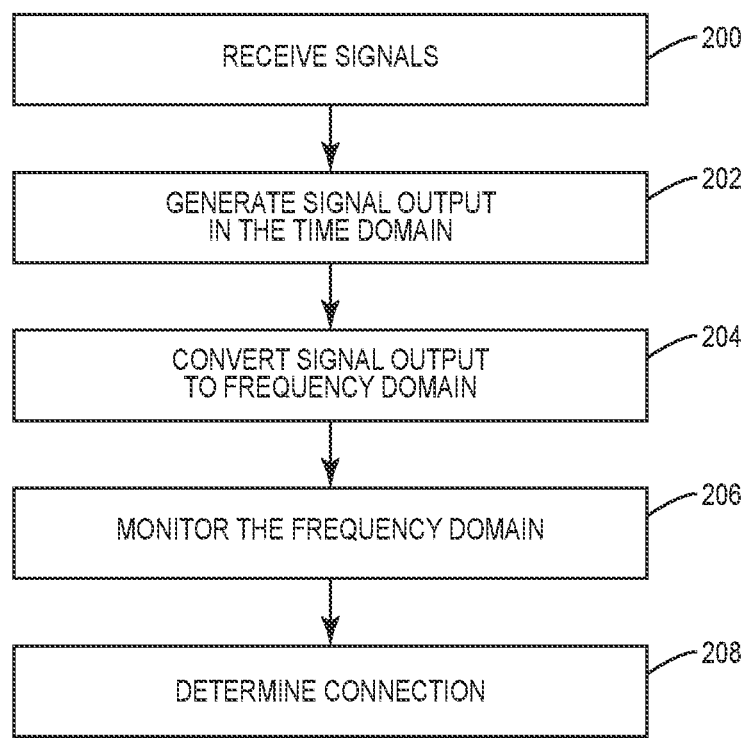
FIG. 7 is a flowchart diagram illustrating a method of determining a connection status of a boom.

FIG. 7 illustrates a method of determining a connection status of the boom 20. The computing device 50 receives signals from one or more sensors 30 that sense a structural property of the boom 20 (block 200). The computing device 50 generates a signal output of the structural property in a time domain (block 202). The signal output is converted from the time domain to a frequency domain (block 204). The modes are isolated and monitored in the frequency domain (block 206). The computing device 50 determines the connection status of the boom 20 based the modes (block 208).

Figure 8:
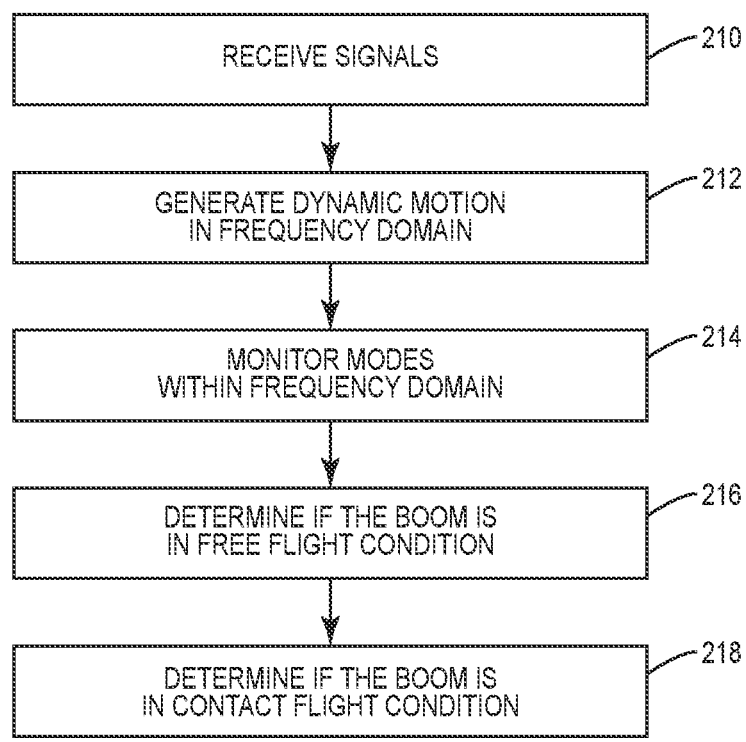
FIG. 8 is a flowchart diagram illustrating a method of determining a connection status of a boom.

FIG. 8 illustrates a method of determining a connection status of a boom 20. The method includes receiving signals indicating a dynamic motion of the boom 20 (block 210) and generating the dynamic motion of the boom 20 in a frequency domain (block 212). The method then includes monitoring modes of the dynamic motion within the frequency domain (block 214). Based on the modes, a determination is made whether the boom 20 is in a free flight condition (block 216) or whether the boom 20 is in a contact flight condition that is connected to the receiver aircraft 90 (block 218).

In one example, the computing device 50 is positioned on the tanker aircraft 100. The computing device 50 can be a dedicated unit that determines the status of the boom 20. In another example, the computing device 50 performs one or more additional functions. For example, the computing device 50 can be part of the flight control computer that oversees the operation of the tanker aircraft 100.

In another example, the computing device 50 is located remotely from the tanker aircraft 100. One example includes the computing device 50 being ground-based, such as a remote server that receives the signals from a communication system on the tanker aircraft 100.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining a connection status of a boom that extends from a tanker aircraft with a receiver aircraft, the method comprising:
   receiving sensor data from one or more sensors that sense a structural property of the boom with the sensors being mounted on the boom and with the boom extended outward from the tanker aircraft and wherein the sensor data indicates a change in the structural property;
   generating a signal output representing the structural property in a time domain;
   converting the signal output from the time domain to a frequency domain;
   isolating modes within the frequency domain;
   monitoring the modes in the frequency domain; and
   determining the connection status of the boom based the modes while the tanker aircraft is in flight.

2. The method of claim 1, further comprising determining when the boom connects to the receiver aircraft based on a change in the modes above a predetermined threshold.

3. The method of claim 1, further comprising measuring the dynamic motion of the boom based on signals from three inertial measurement units that are positioned on the boom.

4. The method of claim 1, wherein monitoring the modes in the frequency domain comprises monitoring the modes in real time.

5. The method of claim 1, wherein the structural property comprises one or more of stiffness, mass, and geometry of the boom.

6. The method of claim 1, wherein receiving the signals from the one or more sensors that sense the structural property of the boom comprises receiving the signals of an axial load on the boom.

7. The method of claim 1, wherein receiving the signals from the one or more sensors that sense the structural property of the boom comprises receiving the signals of a vertical/lateral load exerted on the boom.

8. The method of claim 1, further comprising determining the connection status of the boom without receiving a connection signal from a contact sensor on the boom.

9. The method of claim 1, further comprising applying a Fourier transform to the signal output and generating the signal output in the frequency domain.

10. A computing device configured to determine a connection status of a boom that extends from a tanker aircraft with a receiver aircraft, the computing device comprising:
    memory circuitry configured to store programming instructions; and
    processing circuitry configured to:
      while the aircraft is in flight, receive sensor data from one or more sensors connected to the boom indicating a dynamic motion of the boom;
      generate the dynamic motion of the boom in a time domain;
      generate the dynamic motion of the boom in a frequency domain based on the dynamic motion in the time domain;
      monitor modes of the dynamic motion within the frequency domain;
      determine that the boom is in a free flight condition based on the modes; and
      while the aircraft is in flight and the boom is extended, determine that the boom is in a contact flight condition when the boom connects to the receiver aircraft based on the modes.

11. The computing device of claim 10, wherein the processing circuitry is further configured to determine a change in the modes within the frequency domain and determine that the boom has moved from the free flight condition to the contact flight condition.

12. The computing device of claim 10, wherein the processing circuitry is further configured to receive input signals from an input device that adjusts a position of the boom relative to the receiver aircraft.

13. The computing device of claim 10, wherein the processing circuitry is further configured to isolate the modes within the frequency domain prior to monitoring the modes of the dynamic motion.

14. The computing device of claim 10, wherein the processing circuitry is configured to determine a change in mass of the boom.

15. The computing device of claim 10 wherein the processing circuitry is configured to determine a change in stiffness of the boom.

16. The computing device of claim 10, further comprising one or more inertial measurement units configured to be mounted on the boom to detect the dynamic motion of the boom.

17. The computing device of claim 10, wherein the computing device is positioned on the tanker aircraft.

18. The computing device of claim 10, wherein the computing device is ground-based and remote from both the tanker aircraft and the receiver aircraft.

19. A computer program product comprising program code to be executed by a computing device to determine a connection status of a boom on a tanker aircraft with a receiver aircraft, whereby execution of the program code causes the computing device:
    receive sensor data from one or more sensors connected to the boom indicating a dynamic motion of the boom;
    generate the dynamic motion of the boom in a time domain;
    convert the dynamic motion from the time domain to a frequency domain;
    monitor modes of the dynamic motion within the frequency domain;
    isolate modes within the frequency domain;
    monitor the modes in the frequency domain; and
    while the receiver aircraft is in flight with the boom extended outward, determine that the boom has connected to the receiver aircraft based on a change in the modes.

20. The computer program product of claim 19, wherein the program code causes the computing device to monitor the modes in the frequency domain in real time.

* * * * *